Dec. 30, 1969 ISAMU KUBOTA 3,486,814
MOTION PICTURE CAMERA LIGHT CONTROL MEANS
Filed April 8, 1966 2 Sheets-Sheet 1
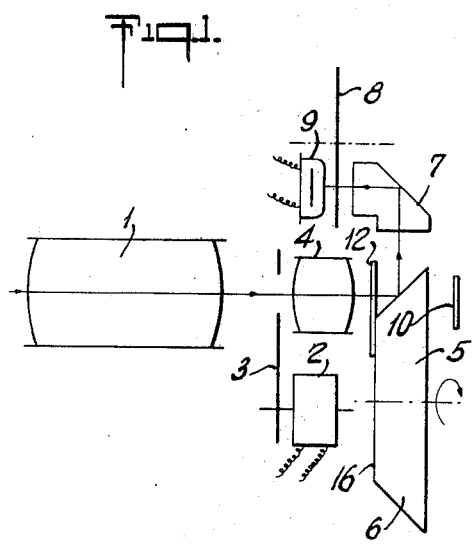
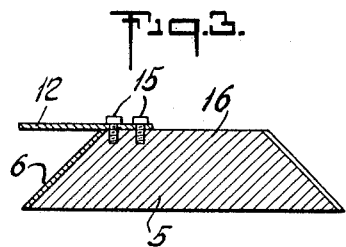
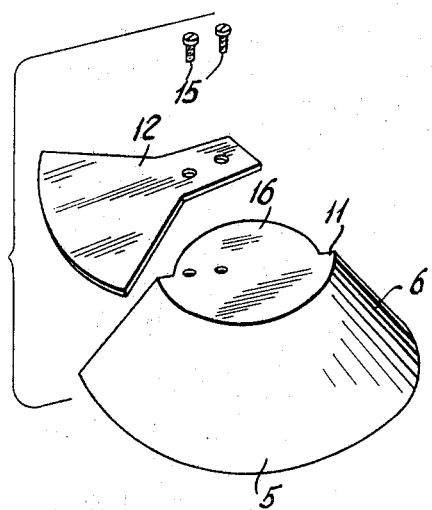
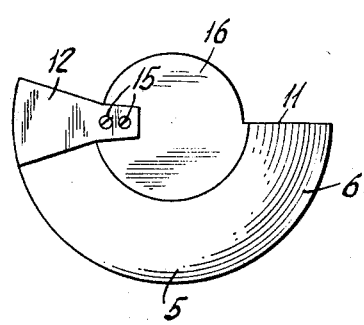
INVENTOR
ISAMU KUBOTA
BY Stanley Wolder
ATTORNEY Dec. 30, 1969  ISAMU KUBOTA  3,486,814
MOTION PICTURE CAMERA LIGHT CONTROL MEANS
Filed April 8, 1966  2 Sheets-Sheet 2
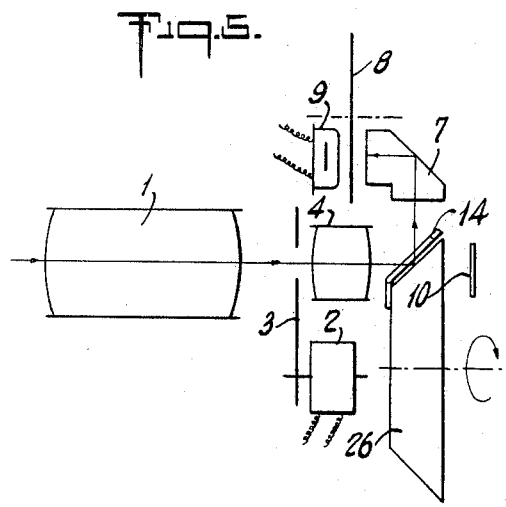
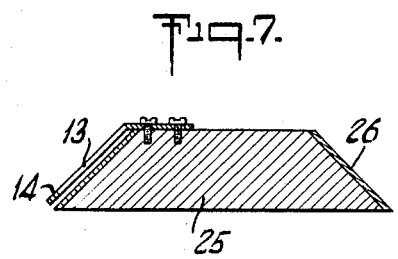
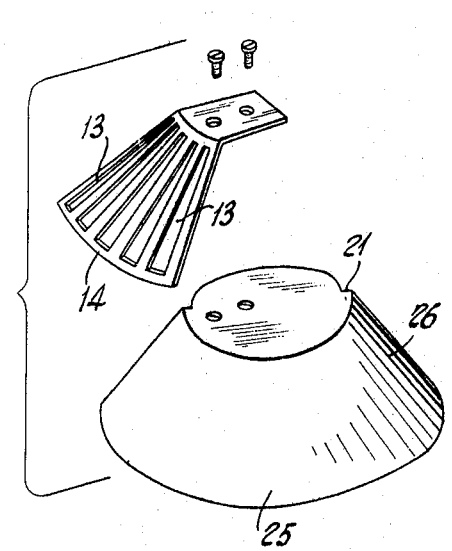
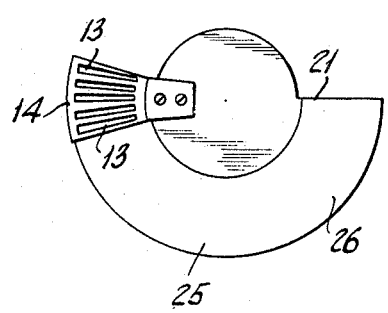
INVENTOR
ISAMU KUBOTA
BY Stanley Welder
ATTORNEY United States Patent Office 3,486,814
Patented Dec. 30, 1969

3,486,814
MOTION PICTURE CAMERA LIGHT
CONTROL MEANS
Isamu Kubota, Sakai-shi, Japan, assignor to Minolta
Camera Company Ltd., Osaka, Japan, a corporation of
Japan
Filed Apr. 8, 1966, Ser. No. 541,174
Int. Cl. G03b 7/08, 9/10
U.S. Cl. 352—141                               4 Claims

ABSTRACT OF THE DISCLOSURE

A motion picture camera includes a rotating circular shutter having a reflecting frustoconical front face movable across the light path through the objective to cyclically alternately expose the film and reflect the light to the diaphragm controlling photocell. A slotted plate is mounted on the shutter and masks that section of the reflecting face positioned in the light path during the shutter dormant position to reduce by one-half the light directed to the photocell during the shutter stopped condition.

---

The present invention relates generally to improvements in photographic devices and it relates more particularly to an improved automatic exposure motion picture camera of the type controlled by the light through the camera objective lens.

In photographic cameras which are provided with light meters or light controlled automatic diaphrgams the photosensitive element may be exposed to the camera incident light directly or may be exposed to the image forming light passing through the camera objective lens. The latter system provides many advantages since the light incident on the photosensitive element is a direct function of the light incident on the photographic film and is thus independent of the objective lens or any filters as such. However, particularly when applied to motion picture cameras, through the lens light meters or controls possess important drawbacks. When a semimirror or other light splitting arrangement is employed for directing the light from the objective onto the film as well as onto the photosensitive element, not only is the film incident light appreciably reduced but this is often a source of distortion. An alternative method alternately directs the light to the photosensitive element and to the film so that during shutter exposure all the light is incident on the film. In the latter arrangement of conventional construction, however, the light incident in the photosensitive element, during the dormant and operational periods of the camera shutter are different whereby to provide inconsistent indications and at certain intervals poor diaphragm control. The means heretofore proposed for overcoming this latter drawback leaves much to be desired.

It is therefore a principal object of the present invention to provide an improved photographic camera.

Another object of the present invention is to provide an improved motion picture camera of the type having a built-in light sensitive device for automatically controlling the camera diaphragm or for furnishing a visual indication of the intensity of the light.

Still another object of the present invention is to provide an improved motion picture camera in which the diaphragm opening is automatically controlled in response to the light passing through the camera objective lens.

A further object of the present invention is to provide an improved through the lens light controlled automatic diaphragm motion picture camera having a light sensitive element exposed during the camera shutter closed intervals and wherein the average light incident on the photosensitive element is the same during the operation of the camera shutter and during the dormancy thereof.

Still a further object of the present invention is to provide a motion picture camera of the above nature characterized by its reliability, accuracy, ruggedness, simplicity and low cost.

The above and other objects of the present invention will become apparent from a reading of the following description taken in conjunction with the accompanying drawing, wherein:

FIGURE 1 is a side elevation partially diagrammatic view of the exposure and control mechanism of a camera embodying the present invention;

FIGURE 2 is an exploded perspective view of the shutter and light reflecting member thereof;

FIGURE 3 is a transverse sectional view of said shutter member;

FIGURE 4 is a top plan view thereof;

FIGURE 5 is a side elevational view of another form of shutter member embodying the present invention;

FIGURE 6 is an exploded perspective view thereof;

FIGURE 7 is a transverse sectional view thereof; and

FIGURE 8 is a top plan view thereof.

In a sense the present invention contemplates the provision of a motion picture camera comprising an objective lens, a photosensitive element, means coupled to said photosensitive element and responsive to the light incident thereon, a shutter member movable across the path of light through said objective lens to alternately successively mask and expose the film carried by said camera to light passing through said objective lens and being selectively actuatable and deactuatable, said shutter member assuming a predetermined dormant position when deactuated, a light reflecting member alternately movable into and out of the path of said light through said objective lens in synchronism with said shutter being in said film masking and film exposure positions respectively, a light filter, and means positioning said light filter across the path of said light through said objective lens when said shutter member is in said dormant position. According to a preferred form of the present camera the shutter is rotatable about an axis parallel to and offset from the optical axis of the objective lens and carries along the periphery of the closed section thereof a frustoconically surfaced mirror which reflects light from the objective lens to the photosensitive element during the shutter closed interval. The light filter is mounted on the shutter and movable therewith and is in the objective lens light path when the shutter member is in its closed dormant position and is either parallel to the reflector or perpendicular to the objective optical axis. The light absorbing value of the light filter is such that under similar camera incident light conditions the light incident on the photosensitive element is the same for shutter actuated and shutter dormant conditions.

Referring now to drawings and particularly to FIGURES 1 to 4 thereof which illustrate a preferred embodiment of the present invention, the reference numerals 1 and 4 generally designate the front and rear sections, respectively of the camera objective lens between which is disposed an adjustable aperture diaphragm 3 of known construction which is coupled to and controlled by the movable armature of a sensitive electric current meter 2. The input to the meter 2 is coupled through any known network to a photosensitive element 9 which may be a photoconductor, photovoltaic cell or the like and varies the current to the meter 2 in accordance with the amount of light incident on the photosensitive element 9 and hence the diaphragm opening. The meter 2 may also provide a visual measurement of the light incident on the photosensitive element 9.

A shutter 5 is positioned rearwardly of the objective lens section 4 and forwardly of the film 10 framed in the focal plane of the objective lens system and is rotatable about an axis transversely offset from and parallel to the optical axis of the objective lens. The shutter 5 is selectively rotated in any known manner such as by an electric or spring wound motor and includes shutter open or aperture section 11 extending circumferentially for somewhat less than 180° about the shutter, and a shutter closed section extending for the remainder of the circumference of the shutter and which is of frustoconical shape having a front flat face 16 and a rearwardly facing base. Upon rotation of the shutter member 5 the shutter closed and shutter open sections successively intercept the objective lens optical axis to alternately expose the film 10 and mask the film 10 during its frame advance.

A mirror 6 having a 45° frustoconical surface directed forwardly extends along the corresponding peripheral face of the shutter closed section and is movable therewith across the light path through the objective lens. A light filter member 12 is coplanar with and secured to the front face 16 of the shutter member 5 and includes a sector shaped section positioned in axial alignment with an end section of the front face of the mirror 6 and a radially projecting tongue which is fastened to the shutter front face 16 by screws 15. It is important to note that when the shutter member 5 is in its deactuated dormant position the filter member 12 intercepts the light passing through the objective lens toward the mirror 6. The filter member 12 is preferably neutral and has a light absorption value such that under similar light conditions, the amount of light passing through the filter 12 and reflected by the mirror 6 to the photosensitive element 9 is the same as the average light intermittently directed thereto by the rotating mirror 6 during the actuation of the shutter member 5. A 45° prism 7 is positioned above the optical axis of the objective lens and above and in alignment with the mirror 6 and reflects light directed on the mirror 6 through the objective lens, onto the photosensitive element 9. An adjustable or replaceable filter 8 is positioned between the prism 7 and the photosensitive element 9 to permit the adjustment of the automatic control system in accordance with the sensitivity of the film.

The operation of the improved camera is clear from the above description. By reason of the filter element 12 having the parameters above set forth and being located in the path of light passing through the objective lens during the shutter dormant condition, the response of the meter 2 and the opening of the diaphragm 3 is independent of and does not vary with the actuation or deactuation of the shutter member but only with respect to on the ambient light conditions. Moreover, the provision and assembly of the light filter element 12 is simple and inexpensive and does not significantly influence the cost of the camera while greatly increasing the usefulness thereof.

In FIGURES 5 to 8 of the drawing there is illustrated another embodiment of the recent invention differing from that first described only in the construction and positioning of the light filter which is in the form of a slotted mask. Specifically, the shutter 25 is of the same configuration as the previously described shutter 5 being similarly driven and associated with the remainder of the camera and includes a shutter aperture section 21 and a shutter closed section of frustoconical shape having a rear base and a flat front face. The peripheral face of the shutter closed section is covered by a correspondingly shaped frustoconical mirror 26 having a 45° forwardly directed face. The compensating light filter is formed of an opaque material, for example aluminum, and includes a curved triangular main or mask section 14 which is parallel to and positioned a short distance forwardly of the front face of the mirror 26 and masks only about that section thereof which registers with objective lens light path when the shutter member is in its dormant position. The mask section 14 has a plurality of longitudinal slots 13 formed therein of such dimensions that the amount of light passing therethrough and reflected to the photosensitive element when the shutter member is dormant is the same as the average amount of light reflected thereto during the actuation of the shutter member. A tongue extends radially from the filter section 14 and is secured by screws to the front face of the shutter member.

In all other constructional details and in operation the apparatus last described is similar to that first described.

While there have been described and illustrated preferred embodiments of the present invention it is apparent that numerous alternations, omissions and additions may be made without departing from the spirit thereof.

What is claimed is:

1. A motion picture camera comprising an objective lens, a photosensitive element, means coupled to said photosensitive element and responsive to the light incident thereon, a shutter member including circumferentially spaced open and closed shutter sections and rotatable across the path of light through said objective lens to alternately successively mask and expose the film carried by said camera to light passing through said objective lens and being selectively actuatable and deactuatable, said shutter member assuming a predetermined dormant position when reactuated, a light reflecting member alternately movable into and out of the path of said light through said objective lens in synchronism with said shutter being in said film masking and film exposure positions respectively and including a frustoconical surfaced mirror extending along said closed shutter section to direct light passing through said objective lens toward said photosensitive element, a light filter including a multi-apertured opaque plate secured to and rotatable with said shutter member, and positioned across the path of said light through said objective lens when said shutter member is in said dormant position.

2. The camera of claim 1 wherein said shutter member is rotatable about an axis parallel to and transversely offset from the optical axis of said objective lens and said light filter member is positioned in a plane perpendicular to said optical axis and between said objective lens and that section of said reflecting member disposed in the path of light through said objective lens when said shutter member is in said dormant position.

3. The camera of claim 1 wherein said shutter member is rotatable about an axis parallel to and transversely offset from the optical axis of said objective lens and said light filter member is positioned in a plane closely spaced and parallel to said reflecting member at that section of said reflecting member disposed in the path of light through said objective lens when said shutter member is in said dormant position.

4. The camera of claim 1 wherein said light filter member comprises a slotted plate.

References Cited

UNITED STATES PATENTS

| | | | |
|---|---|---|---|
| 2,236,380 | 3/1941 | Rausch | 352—147 |
| 3,057,251 | 10/1962 | Mahn | 352—141 |
| 3,099,193 | 7/1963 | Freudenschuss | 352—141 XR |
| 3,248,166 | 4/1966 | Reinsch | 352—141 |

FOREIGN PATENTS

| | | |
|---|---|---|
| 1,377,796 | 9/1964 | France. |
| 135,711 | 12/1919 | Great Britain. |
| 381,980 | 11/1964 | Switzerland. |

NORTON ANSHER, Primary Examiner

J. F. PETERS, Jr., Assistant Examiner

U.S. Cl. X.R.

95—10; 352—208